United States Patent
Hwang et al.

(10) Patent No.: US 10,757,752 B2
(45) Date of Patent: Aug. 25, 2020

(54) CONNECTION RELEASE TIMERS AND SETTINGS

(71) Applicant: Nokia Solutions and Networks Oy, Espoo (FI)

(72) Inventors: Woonhee Hwang, Espoo (FI); Jarkko T. Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/894,242

(22) Filed: Feb. 12, 2018

(65) Prior Publication Data

US 2019/0053327 A1  Feb. 14, 2019

Related U.S. Application Data

(63) Continuation of application No. 14/350,130, filed as application No. PCT/IB2012/055392 on Oct. 5, 2012, now Pat. No. 9,913,317.

(Continued)

(51) Int. Cl.
*H04W 76/38* (2018.01)
*H04W 8/02* (2009.01)
(Continued)

(52) U.S. Cl.
CPC ............ *H04W 76/38* (2018.02); *H04W 8/02* (2013.01); *H04W 76/28* (2018.02); *H04W 76/27* (2018.02)

(58) Field of Classification Search
CPC ....... H04W 76/38; H04W 8/02; H04W 76/28; H04W 76/27
See application file for complete search history.

(56) References Cited

U.S. PATENT DOCUMENTS 5,883,885 A * 3/1999 Raith ................ H04B 7/2656
                                                    370/311
9,913,317 B2 * 3/2018 Hwang ............... H04W 76/38
(Continued)

FOREIGN PATENT DOCUMENTS

EP       2 355 610 A1    8/2011
WO   WO 2009/062304 A1   5/2009
(Continued)

OTHER PUBLICATIONS

3GPP TS 36.300 V8.12.0 (Mar. 2010), "3rd Generation Partnership Project; Technical Specification Group Radio Access network; Evolved Universal Terrestrial Radio Access (E-UTRA) and Evolved Universal Terrestrial Radio Access Network (E-UTRAN); Overall description Stage 2 (Release 8)", 149 pgs.

(Continued)

*Primary Examiner* — Joseph E Dean, Jr.
(74) *Attorney, Agent, or Firm* — Harrington & Smith

(57) ABSTRACT

In accordance with the exemplary embodiments of the invention there is at least a method and an apparatus to generate a message including mobile device-specific information related to operation of a state transition timer for the mobile device, and send the generated message towards an access point associated with a wireless communication network. Further, in accordance with the exemplary embodiments of the invention there is at least a method an apparatus to receive a message from a wireless communication network, the message including mobile device-specific information related to operation of a state transition timer for the mobile device; based on the mobile device-specific information, setting optimal connection parameters for the mobile device; and sending an indication of the optimal connection parameters towards the mobile device.

20 Claims, 6 Drawing Sheets

Related U.S. Application Data

(60) Provisional application No. 61/544,357, filed on Oct. 7, 2011.

(51) Int. Cl.
*H04W 76/28* (2018.01)
*H04W 76/27* (2018.01)

(56) References Cited

U.S. PATENT DOCUMENTS

| | | | | |
|---|---|---|---|---|
| 2005/0239442 A1* | 10/2005 | Chen | ............... | H04W 4/12 455/412.2 |
| 2006/0080659 A1* | 4/2006 | Ganji | ............... | G06F 8/61 717/178 |
| 2006/0160558 A1 | 7/2006 | Kim et al. | ............... | 455/522 |
| 2010/0085905 A1* | 4/2010 | Matsue | ............... | H04W 76/27 370/312 |
| 2011/0222451 A1* | 9/2011 | Peisa | ............... | H04W 52/0225 370/311 |
| 2015/0257055 A1* | 9/2015 | Prakash | ............... | H04W 36/0083 455/436 |
| 2016/0127884 A1* | 5/2016 | Kim | ............... | H04W 8/02 455/435.2 |

FOREIGN PATENT DOCUMENTS

| | | |
|---|---|---|
| WO | WO 2010/054391 A2 | 5/2010 |
| WO | WO 2011/085802 A1 | 7/2011 |

OTHER PUBLICATIONS

3GPP TS 36.300 V9.7.0 (Mar. 2011), "3$^{rd}$ Generation Partnership Project; Technical Specification Group Radio Access network; Evolved Universal Terrestrial Radio Access (E-UTRA) and Evolved Universal Terrestrial Radio Access Network (E-UTRAN); Overall description Stage 2 (Release 9)", 174 pgs.

3GPP TS 36.300 V10.4.0 (Jun. 2011), "3$^{rd}$ Generation Partnership Project; Technical Specification Group Radio Access network; Evolved Universal Terrestrial Radio Access (E-UTRA) and Evolved Universal Terrestrial Radio Access Network (E-UTRAN); Overall description Stage 2 (Release 10)", 194 pgs.

3GPP TR 36.913 V8.0.1 (Mar. 2009), 3$^{rd}$ Generation Partnership Project; Technical Specification Group Radio Access network; Requirements for further advancements for Evolved Universal Terrestrial Radio Access (E-UTRA) (LTE-Advanced) (Release 8), 15 pgs.

3GPP TR 36.913 V9.0.0 (Dec. 2009), 3$^{rd}$ Generation Partnership Project; Technical Specification Group Radio Access network; Requirements for further advancements for Evolved Universal Terrestrial Radio Access (E-UTRA) (LTE-Advanced) (Release 9), 15 pgs.

3GPP TR 36.913 V10.0.0 (Mar. 2011), 3$^{rd}$ Generation Partnership Project; Technical Specification Group Radio Access network; Requirements for further advancements for Evolved Universal Terrestrial Radio Access (E-UTRA) (LTE-Advanced) (Release 10), 15 pgs.

3GPP TSG-RAN WG2 Meeting #60, Jeju, South Korea, Nov. 5-9, 2007, R2-074848, "UE 'Fast Dormancy' Behaviour", Vodafone, RIM, Huawei, 9 pgs.

GSMA, "Fast Dormancy Best Practises", Version 1.0, Jul. 27, 2011, 23 pages.

R2-105477, Nokia Siemens Networks, "UE power saving and fast dormancy in LTE network", 3GPP TSG-RAN WG2 Meeting #71bis, Xian, China, Oct. 11-15, 2010.

RP-111123, Research Motion UK Ltd, et al., "Work item or LTE RAN Enhancements for Diverse Data Applications", 3GPP TSG RAN Meeting #53, Fukuoka, Japan Sep. 13-16, 2011, core & feature part.

* cited by examiner

CONNECTION RELEASE TIMERS AND SETTINGS

CROSS-REFERENCE TO RELATED APPLICATIONS

This application is a continuation of U.S. application Ser. No. 14/350,130 filed on Apr. 7, 2014, which is the National Stage of International Application No. PCT/IB2012/055392, filed Oct. 5, 2012, which claims the benefit of U.S. Provisional Application No. 61/544,357, filed Oct. 7, 2011, the disclosures of which are hereby incorporated by reference in their entireties.

TECHNICAL FIELD

The exemplary and non-limiting embodiments of this invention relate generally to wireless communication systems, apparatus, methods and computer program products and, more specifically, relate to connection release timers and settings.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations are utilized herein:
3GPP third generation partnership project
BS base station
BW bandwidth
CGI cell global identity
DCH dedicated channel
DL downlink (eNB towards UE)
DRX discontinuous reception
eNB E-UTRAN Node B (evolved Node B)
EPC evolved packet core
E-UTRAN evolved UTRAN (LTE)
FACH forward access transport channel
FDMA frequency division multiple access
GSM global system for mobile communication
HO handover or handoff
HSPA high speed packet access
IMEI international mobile equipment identity
IMT-A international mobile telephony-advanced
ITU international telecommunication union
ITU-R ITU radiocommunication sector
LTE long term evolution of UTRAN (E-UTRAN)
LTE-A LTE advanced
MAC medium access control (layer 2, L2)
MM/MME mobility management/mobility management entity
NAS non-access stratum
Node B base station
NW network
OFDMA orthogonal frequency division multiple access
O&M operations and maintenance
PCH paging channel
PCI physical cell identity
PDCP packet data convergence protocol
PHY physical (layer 1, L1)
QoS quality of service
Rel release
RLC radio link control
RNC radio network controller
RRC radio resource control
RRM radio resource management
S-GW serving gateway
SC-FDMA single carrier, frequency division multiple access
UE user equipment, such as a mobile station, mobile node or mobile terminal
UL uplink (UE towards eNB)
UMTS universal mobile telecommunications system
URA UTRAN registration area
UTRAN universal terrestrial radio access network
WI working item The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.12.0 (2010-04), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)," incorporated by reference herein in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. Release 9 versions of these specifications have been published, including 3GPP TS 36.300, V9.7.0 (2011-3), incorporated by reference herein in its entirety. Release 10 versions of these specifications have been published, including 3GPP TS 36.300, V10.4.0 (2011-06), incorporated by reference herein in its entirety.

FIG. 1 reproduces FIG. 4-1 of 3GPP TS 36.300 V8.12.0, and shows the overall architecture of the E-UTRAN system 2 (Rel-8). The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A is part of LTE Rel-10. LTE-A is a more optimized radio system fulfilling the ITU-R requirements for IMT-A while maintaining backward compatibility with LTE Rel-8. Reference is further made to a Release 9 version of 3GPP TR 36.913, V9.0.0 (2009-12), incorporated by reference herein in its entirety. Reference is also made to a Release 10 version of 3GPP TR 36.913, V10.0.0 (2011-06), incorporated by reference herein in its entirety.

As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of the carrier aggregation, where M Rel-8 component carriers are combined together to form MxRel-8 BW (e.g., 5×20 MHz=100 MHz given M=5). Rel-8 terminals receive/transmit on one component carrier, whereas LTE-A terminals may receive/transmit on multiple component carriers simultaneously to achieve higher (wider) bandwidths.

UE battery saving has been a big topic in the last few years in UMTS as battery consumption is increasing compared to GSM UEs due to the difference in the supported bands, more complicated functionalities in the UE, and smarter application activities, as non-limiting examples. In the case of UMTS, a UE can be in one of many different states (e.g., Cell-DCH, Cell-FACH, URA/Cell-PCH and IDLE) and the battery consumption is dependent on the state (e.g., different battery consumptions for different states).

In LTE, the network can configure the DRX for RRC CONNECTED UE battery saving so that the UE wakes up only in a limited time. As with UMTS, if the UE does not have activity for a certain time period, the network will release the RRC Connection at some point. From a UE power consumption point of view, a longer DRX and RRC IDLE may be rather similar. However, the network implication will be quite different. In the case of long DRX, as the UE is in the RRC CONNECTED mode, in case the UE is moving and crosses the border of the cell, a handover should be performed. Thus, handover-related measurement signaling and handover signaling will increase. Alternatively, if the UE is in IDLE, RRC Connection Setup signaling will increase but no handover is required. Thus, for fast moving UEs not having constant data activity, the IDLE state is more preferable than long DRX from a network point of view.

SUMMARY

In an exemplary aspect of the invention, there is a method comprising generating a message comprising mobile device-specific information related to operation of a state transition timer for the mobile device, and sending the generated message towards an access point associated with a wireless communication network.

In another exemplary aspect of the invention, there is anon-transitory computer-readable medium including computer program code, the computer program code executed by at least one processor to perform operations comprising: generating a message comprising mobile device-specific information related to operation of a state transition timer for the mobile device; and sending the generated message towards an access point associated with a wireless communication network.

In another exemplary aspect of the invention, there is an apparatus comprising: at least one processor; and at least one memory including computer program code, where the at least one memory and the computer program code are configured, with the at least one processor, to cause the apparatus to at least: generate a message comprising mobile device-specific information related to operation of a state transition timer for the mobile device; and send the generated message towards an access point associated with a wireless communication network.

In another exemplary aspect of the invention, there is an apparatus comprising means for generating a message including mobile device-specific information related to operation of a state transition timer for the mobile device, and means for sending the generated message towards an access point associated with a wireless communication network.

In accordance with the exemplary aspect of the invention as described in the paragraph above at least the means for generating and the means for sending comprises a non-transitory computer readable medium including computer program code, the computer program code executed by at least one processor, and an interface to the wireless communication network.

In another exemplary aspect of the invention, there is a method comprising receiving a message from a wireless communication network, the message comprising mobile device-specific information related to operation of a state transition timer for the mobile device; based on the mobile device-specific information setting optimal connection parameters for the mobile device; and sending an indication of the optimal connection parameters towards the mobile device.

In another exemplary aspect of the invention, there is anon-transitory computer-readable medium including computer program code, the computer program code executed by at least one processor to perform operations comprising: receiving a message from a wireless communication network, the message comprising mobile device-specific information related to operation of a state transition timer for the mobile device; based on the mobile device-specific information setting optimal connection parameters for the mobile device; and sending an indication of the optimal connection parameters towards the mobile device.

In yet another exemplary aspect of the invention, there is an apparatus comprising: at least one processor; and at least one memory including computer program code, where the at least one memory and the computer program code are configured, with the at least one processor, to cause the apparatus to at least: receive a message from a wireless communication network, the message comprising mobile device-specific information related to operation of a state transition timer for the mobile device; based on the mobile device-specific information set optimal connection parameters for the mobile device; and send an indication of the optimal connection parameters towards the mobile device.

In still another exemplary aspect of the invention, there is an apparatus comprising: means for receiving a message from a wireless communication network, the message comprising mobile device-specific information related to operation of a state transition timer for the mobile device; means, based on the mobile device-specific information, for setting optimal connection parameters for the mobile device; and sending an indication of the optimal connection parameters towards the mobile device.

In accordance with the exemplary aspect of the invention as described in the paragraph above at least the means for setting and the means for receiving and sending comprises a non-transitory computer readable medium including computer program code, the computer program code executed by at least one processor, and an interface to the wireless communication network.

DETAILED DESCRIPTION

Figure 1A:
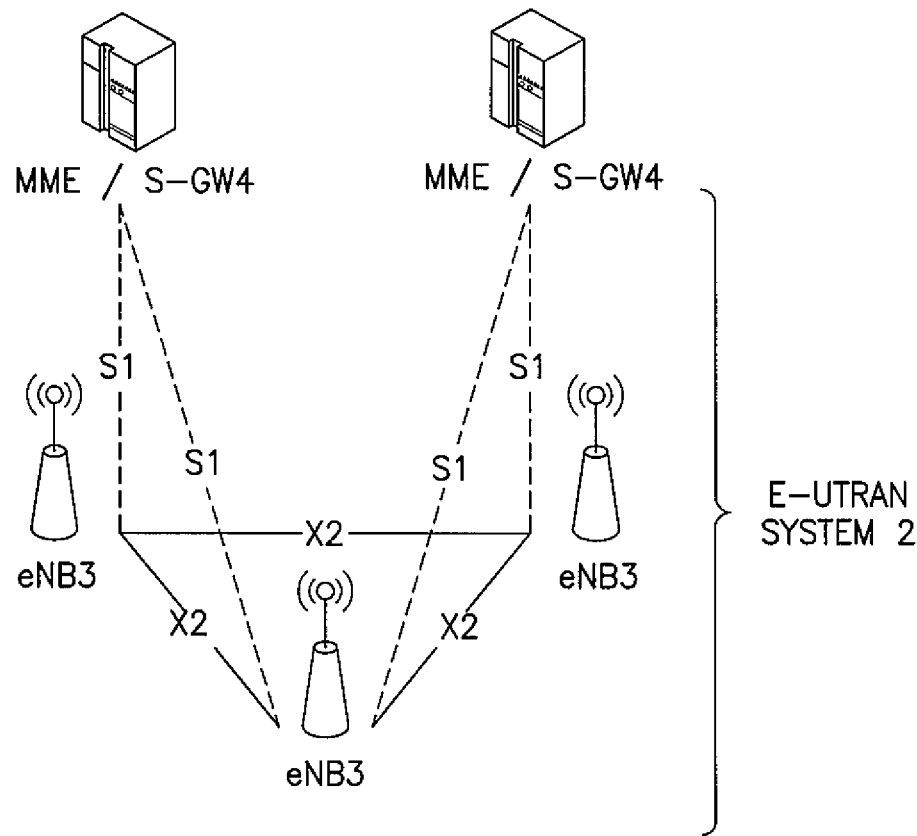
FIG. 1A reproduces FIG. 4-1 of 3GPP TS 36.300 V8.12.0, and shows the overall architecture of the E-UTRAN system.
Figure 1B:
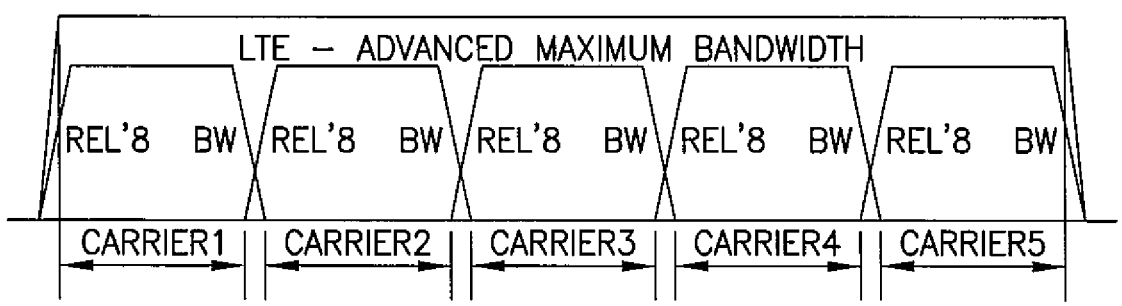
FIG. 1B shows an example of carrier aggregation as proposed for the LTE-A system.
Figure 2A:
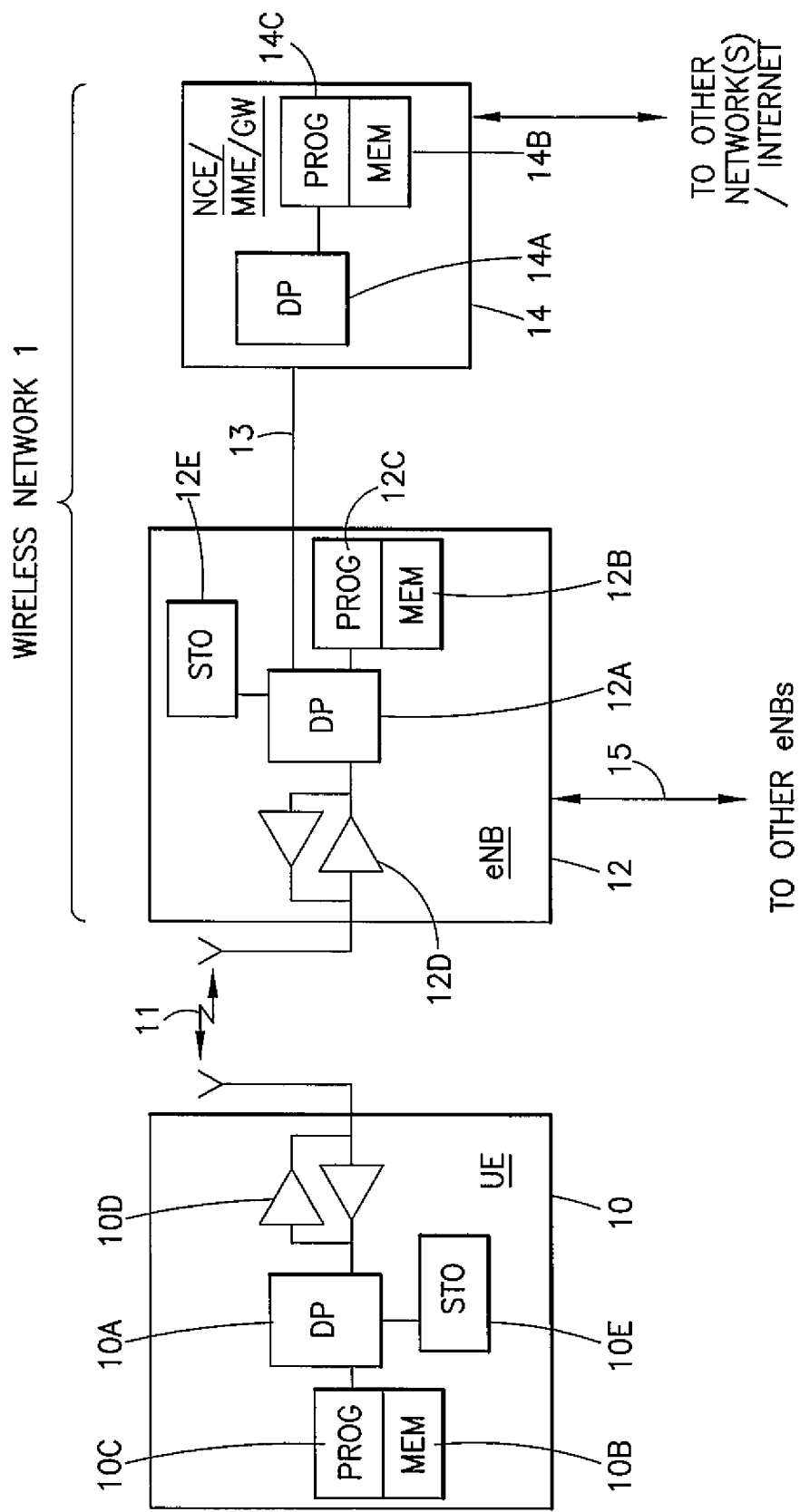
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S-GW functionality shown in FIG. 1, and which provides connectivity with one or more other networks, such as a telephone network and/or a data communications network (e.g., the Internet). The UE 10 includes a controller, such as a computer, processor or data processor (DP) 10A, a computer-readable memory medium embodied as a memory (MEM) 10B that stores a program of computer instructions (PROG) 10C, and a suitable radio frequency (RF) interface 10D for bidirectional wireless communications with the eNB 12 via one or more antennas.

The eNB 12 includes a controller, such as a computer, processor or data processor (DP) 12A, a computer-readable memory medium embodied as a memory (MEM) 12B that stores a program of computer instructions (PROG) 12C, and a suitable radio frequency (RF) interface 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer, processor or data processor (DP) 14A and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

The RF interface 10D, 12D of the UE 10 and/or eNB 12 may comprise one or more transmitters, one or more receivers and/or one or more transceivers, as non-limiting examples. In other exemplary embodiments, the RF interface 10D, 12D of the UE 10 and/or eNB 12 may comprise one or more wireless interfaces and/or one or more communication components configured to perform unidirectional and/or bidirectional wireless communication with one or more other apparatus and/or devices.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention, in some exemplary embodiments the UE 10 may be assumed to also include an additional storage component STO 10E (e.g., at least one memory), and, in further exemplary embodiments, the eNB 12 may include an additional storage component STO 12E (e.g., at least one memory). The STO 10E, 12E may be utilized to store one or more pieces of information, such as those utilized in conjunction with the exemplary embodiments of the invention (e.g., UE mobility status based on cell identity, UE operating system information, UE version number information, brand of the UE).

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 2B:
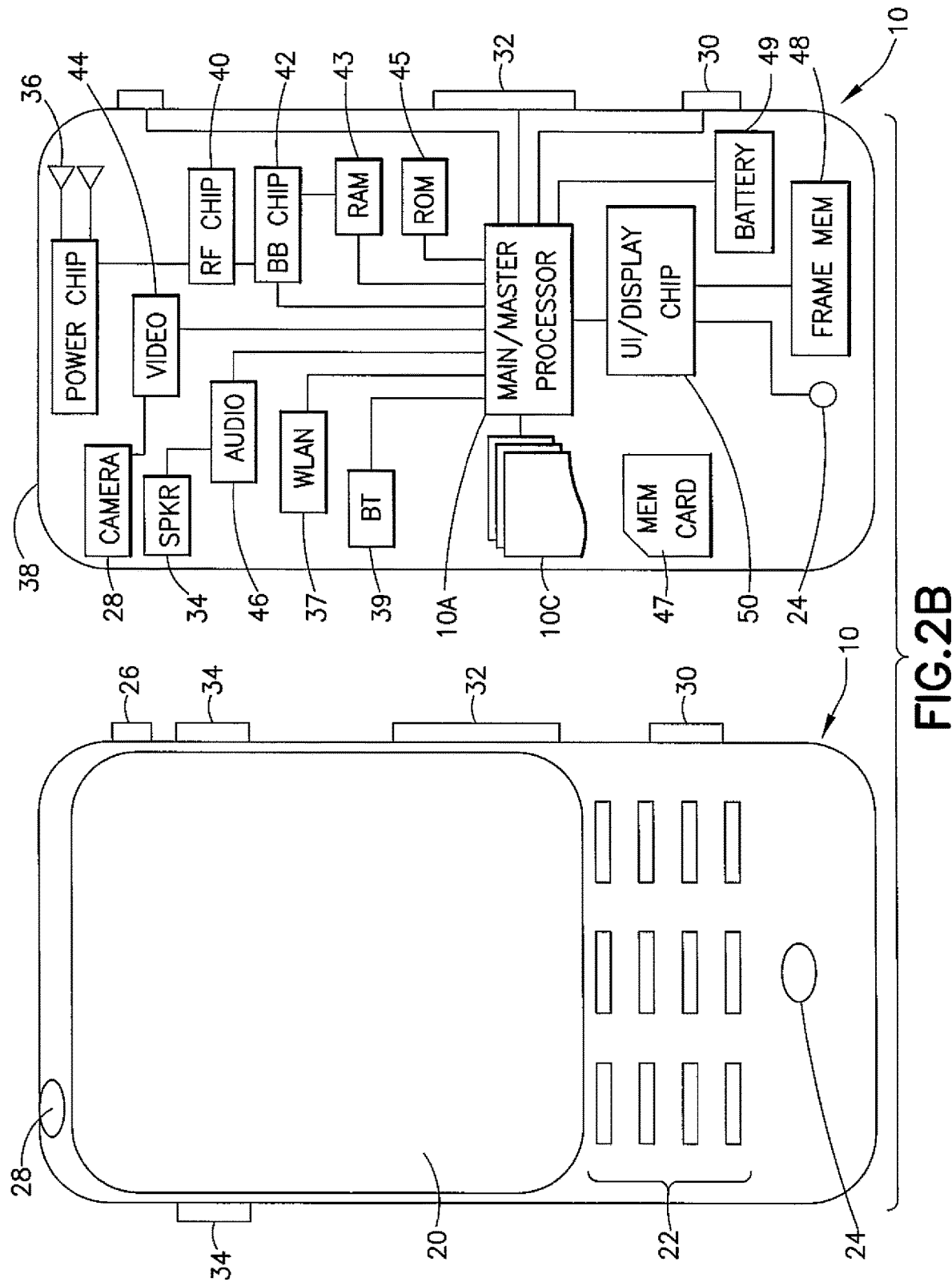
FIG. 2B shows a more particularized block diagram of an exemplary user equipment such as that shown in FIG. 2A.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 32, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention need not be disposed in a central location, but may instead be disposed across various chips and memories as shown or disposed within another processor that combines some of the functions described above for FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to one or more storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to one or more processors, data processors, processing devices, processing components, processing blocks, circuits, circuit devices, circuit components, circuit blocks, integrated circuits and/or chips (e.g., chips comprising one or more circuits or integrated circuits).

This application relates to a 3GPP WI called Enhancements for Diverse Data Applications. The topic is related to UE power saving and is known as fast dormancy issue or smart phone problem in UMTS network. Even though portions of this discussion are directed to aspects of LTE, exemplary embodiments of this invention can be utilized in conjunction with any suitable wireless communication network, standard and/or specification, including: GSM, UMTS and/or any mobile communication system where a UE (e.g., a mobile device) is limited with power usage, as non-limiting examples.

The network controls the UE state transition and, typically, this is primarily decided based on user inactivity during a certain time. Thus, the network typically has timers for state transition (e.g., at least one state transition timer) and, depending on the timer value, the battery consumption can be very different. Furthermore, generally it is not easy to adjust the timer per UE as the network often does not have good knowledge concerning future user activity (e.g., except for the QoS parameter for the bearer). Also for simplicity, currently many networks use a common timer for all UEs in the cell and the timer value is configured by the O&M system.

The network also decides when and what kind of DRX to configure and when to release the RRC Connection based on the information available in the network, such as the QoS parameter for the bearer and other network internal information, for example. However, as for UMTS, those parameters may not be sufficient to optimally adapt the configuration for each UE.

In UMTS, the UE can send a Signaling Connect Release Request message to indicate that it wants to go into power saving mode (e.g., to request this mode). However, LTE currently does not have a similar mechanism. Under LTE, the current DRX configuration and/or RRC Connection Release timer setting is purely a network decision without any UE assistance. It was proposed that a UE indicate it wants to go into power saving mode and the UE could suggest the DRX cycle. However, this solution was not accepted in the 3GPP.

To assist the NW in optimizing UE-specific connection parameters and to maximize the power saving in the UE, in various exemplary embodiments of the invention the UE will provides information to the NW to assist the NW in setting the state transition timer and/or DRX configuration for the UE.

1. UE Mobility Status Based on Cell Identity

For instance, UEs may be more static (e.g., maximum pedestrian speed) in certain locations (e.g., at home, the office, school, locations where the UE will likely be present for an extended period of time, for example, based on past experience). In such a case, the UE can link mobility information with cell identity for these locations. Thus, when the UE is under a cell where the UE is more static or is expected/anticipated to be more static, the UE indicates this information to the network. For example, if the UE indicates that it is in a static cell, the NW may set the RRC Connection release timer for a longer/greater value and keep the UE with a longer DRX for battery saving. As a further example, otherwise by default the NW may set the RRC Connection release timer rather short so that the UE can move into the battery saving mode as soon as the data burst sending is completed. In other exemplary embodiments, the UE can indicate one or more (e.g., a list of) favorite/preferred PCI or CGI to the NW and the NW can consider the UE to be rather static in those cells.

2. Operating System/Version Number/Brand of The UE

It is known that some phone brands and/or operating systems can generate more unattended traffic than others. Thus, by providing more details regarding the phone itself and/or the operating system in use, the NW can consider the statistical traffic behaviour of those phones and configure the parameter(s) optimally for those UEs. As non-limiting examples, the UE can send information (e.g., one or more IEs) for one or more of the following to the NW: an indication of a current operating system of the UE, an indication of a current version of software on the UE (e.g., being run by the UE, being run by a processor of the UE), an indication of a current version of the operating system of the UE, a brand of the UE, an indication of at least one application (e.g., program) that is/are running on the UE (e.g., Facebook®, an instant messaging client, Skype®, etc.), a version of at least one application on the UE, a version of at least one active application on the UE, a type of at least one application on the UE (e.g., an application that is stored, running, active), and/or an indication of at least one frequent application on the UE (e.g., most frequently used or run, for example, as measured by active/running time, number of times the program is run, number of transmissions and/or receptions for that program, approximate interval of connection setups caused by the application, and/or any other suitable metric).

It should be noted that currently a UE may transfer its IMEI to the NW by NAS signalling. However, the OS/version cannot be derived from that and, thus, under current configurations the IMEI would not be sufficient to optimize the connection release timer or DRX configuration. In particular, note that the IMEI is provided by NAS signalling and the MME does not provide the IMEI to the eNB according to the current 3GPP agreement. As such, the eNB does not see the IMEI. However, in accordance with various exemplary embodiments of the invention, if the MME were to provide similar information (e.g., phone brand, etc.) based on the IMEI, this may be used in the eNB to set the optimal connection parameters.

If the UE were to provide the above information in accordance with exemplary embodiments of the invention, it could be provided in the RRC Connection Complete message and/or the HO Complete message, as non-limiting examples. As an alternative, a new UL message could be used to convey the above information (e.g., a similar message as used in UMTS for indicating signalling connection release). As a further example, a new UL message could be used that is sent at any time after the RRC connection is established. In further exemplary embodiments, the above information can be provided as a part of UE capabilities.

Note that the information that the UE provides may include a combination of any of the above information or just one of the proposed informations.

Some of the above-discussed information is static (e.g., a cell global identity for a preferred cell, a physical cell identity for a preferred cell, an indication of a brand of the mobile device) while other of the information may be dynamic (e.g., a mobility status based on a current cell identity, an anticipated mobility status based on the current cell identity, an indication of a current operating system on the mobile device, an indication of a current version of software on the mobile device). As such, the timing of transmission of a message comprising the information may vary based on the information in question. For example, static information may be transmitted to the NW during activation, setup, and/or powering on of the UE, as non-limiting examples. In contrast, dynamic information may be transmitted to the NW at the appropriate time (e.g., when requested, in anticipation of a request, at a periodic time, at a particular location).

In some exemplary embodiments, usage of this information in the NW may be a NW implementation issue. For example, the eNB and/or the RNC may use this information. However, if the solution is accepted in 3GPP, the UE may provide specified information according to the 3GPP specification/agreement. Thus, the above references to a "NW" should be understood to refer to one or more network devices that are used to implement the exemplary embodiments of the invention, such as an access point, a base station, a Node B, an eNB, a RNC, a MME, a relay node, a router, a wireless router, a wireless local area network access point and/or other connection access point, as non-limiting examples.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 3:
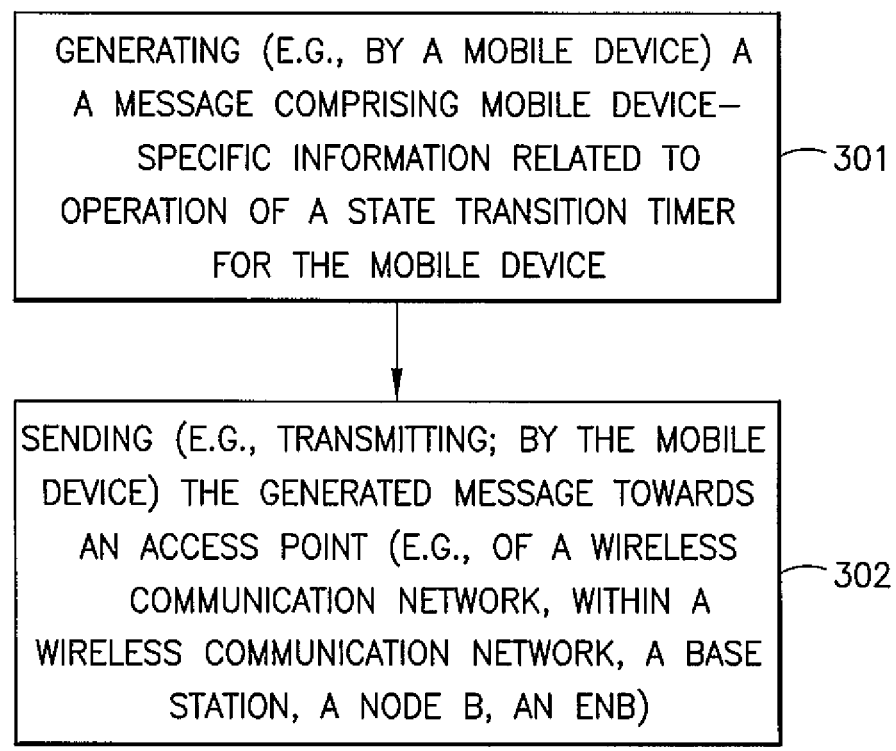
FIG. 3 depicts a flowchart illustrating one non-limiting example of a method for practicing the exemplary embodiments of this invention FIG. 4 and FIG. 5 each depict a flowchart illustrating another non-limiting example of a method for practicing the exemplary embodiments of this invention

(1) In one exemplary embodiment, and with reference to FIG. 3, a method comprising: generating (e.g., by a mobile device) a message comprising mobile device-specific information related to operation of a state transition timer for the mobile device (301); and sending (e.g., transmitting; by the mobile device) the generated message towards an access point (e.g., of a wireless communication network, within a wireless communication network, a base station, a Node B, an eNB) (302).

A method as above, where the mobile device-specific information comprises at least one of a mobility status based on a current cell identity, an anticipated mobility status based on the current cell identity, a cell global identity for a preferred cell, a physical cell identity for a preferred cell, an indication of a current operating system on the mobile device, an indication of a current version of software on the mobile device, an indication of a brand of the mobile device, an indication of at least one application (e.g., program) that is/are running on the UE (e.g., Facebook®, an instant messaging client, Skype®, etc.), a version of at least one application on the UE, a version of at least one active application on the UE, a type of at least one application on the UE (e.g., an application that is stored, running, active), and/or an indication of at least one frequent application on the UE (e.g., most frequently used or run, for example, as measured by active/running time, number of times the program is run, number of transmissions and/or receptions for that program, approximate interval of connection setups caused by the application, and/or any other suitable metric). A method as in any above, where the mobile device-specific information is represented using at least one information element. A method as in any above, implemented within an E-UTRAN (LTE) wireless communication network.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

(2) In another exemplary embodiment, a program storage device (e.g., a computer-readable medium, a non-transitory computer readable medium; readable by a machine/apparatus/processor) tangibly embodying (e.g., storing) a program of instructions (e.g., a computer program, computer program instructions; executable by the machine/apparatus/processor) for performing operations, said operations comprising: generating (e.g., by a mobile device) a message comprising mobile device-specific information related to operation of a state transition timer for the mobile device; and sending (e.g., transmitting; by the mobile device) the generated message towards an access point (e.g., of a wireless communication network, within a wireless communication network, a base station, a Node B, an eNB).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(3) In a further exemplary embodiment, an apparatus comprising: at least one processor; and at least one memory including computer program code, the at least one memory and the computer program code being configured to, with the at least one processor, cause the apparatus at least to perform: generate a message comprising apparatus-specific information related to operation of a state transition timer for the apparatus; and send (e.g., transmit) the generated message towards an access point (e.g., of a wireless communication network, within a wireless communication network, a base station, a Node B, an eNB).

An apparatus as above, where the apparatus comprises a user equipment, a mobile device, a mobile phone, a portable communication apparatus, a cell phone or a camera. An apparatus as in any above, further comprising one or more aspects of the exemplary embodiments of the invention as described herein.

(4) In a further exemplary embodiment, an apparatus comprising: means for generating a message comprising apparatus-specific information related to operation of a state transition timer for the apparatus; and means for sending (e.g., means for transmitting) the generated message towards an access point (e.g., of a wireless communication network, within a wireless communication network, a base station, a Node B, an eNB).

An apparatus as above, where the apparatus comprises a user equipment, a mobile device, a mobile phone, a portable communication apparatus, a cell phone or a camera. An apparatus as in any above, where the means for generating comprises at least one processor and the means for sending comprises at least one transmitter or at least one wireless transmission component. An apparatus as in any above, further comprising one or more aspects of the exemplary embodiments of the invention as described herein.

(5) In a further exemplary embodiment, an apparatus comprising: message generation circuitry configured to generate a message comprising apparatus-specific information related to operation of a state transition timer for the apparatus; and transmission circuitry configured to send (e.g., transmit) the generated message towards an access point (e.g., of a wireless communication network, within a wireless communication network, a base station, a Node B, an eNB).

An apparatus as above, where the apparatus comprises a user equipment, a mobile device, a mobile phone, a portable communication apparatus, a cell phone or a camera. An apparatus as in any above, further comprising one or more aspects of the exemplary embodiments of the invention as described herein.

(6) In a further exemplary embodiment, an apparatus comprising: at least one processor configured to generate a message comprising apparatus-specific information related to operation of a state transition timer for the apparatus; and at least one transmitter configured to send (e.g., transmit) the generated message towards an access point (e.g., of a wireless communication network, within a wireless communication network, a base station, a Node B, an eNB).

An apparatus as above, where the apparatus comprises a user equipment, a mobile device, a mobile phone, a portable communication apparatus, a cell phone or a camera. An apparatus as in any above, further comprising one or more aspects of the exemplary embodiments of the invention as described herein.

Figure 4:
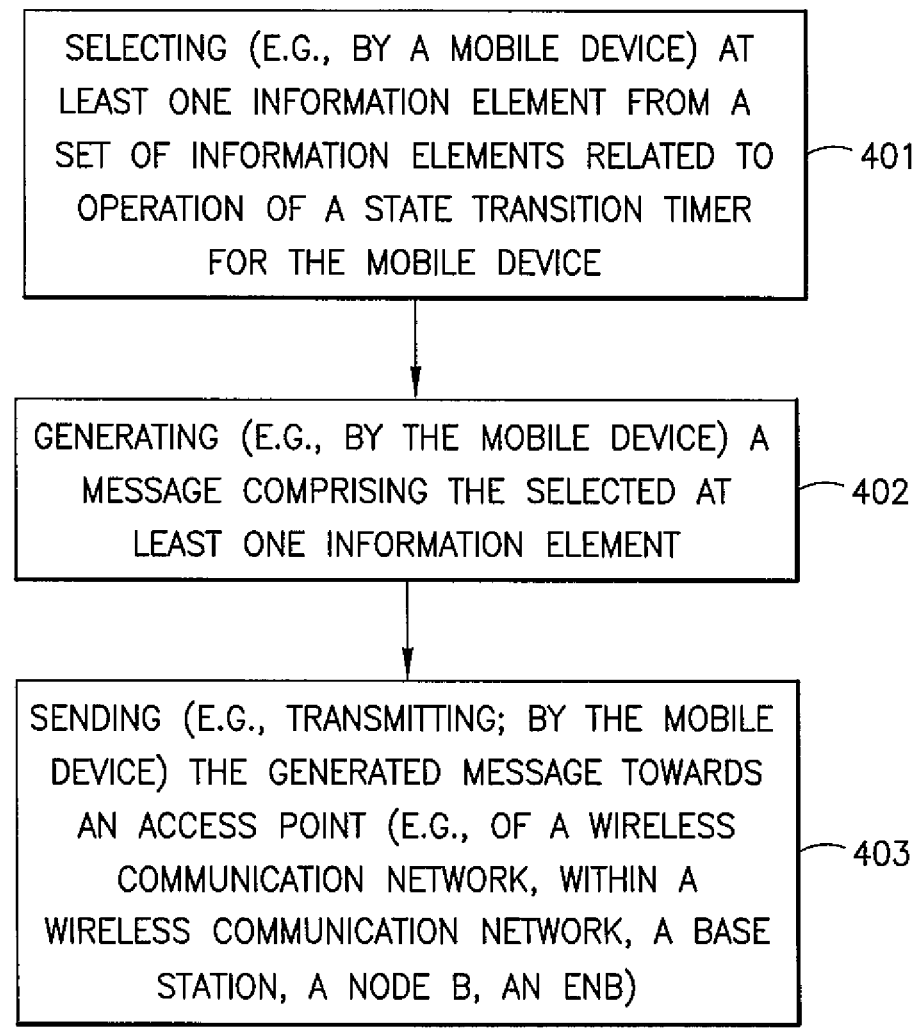

(7) In another exemplary embodiment, and with reference to FIG. 4, a method comprising: selecting (e.g., by a mobile device) at least one information element from a set of information elements related to operation of a state transition timer for the mobile device (401); and generating (e.g., by the mobile device) a message comprising the selected at least one information element (402).

A method as above, further comprising: sending (e.g., transmitting; by the mobile device) the generated message towards an access point (e.g., of a wireless communication network, within a wireless communication network, a base station, a Node B, an eNB) (403). A method as in any above, where the information elements of the set of information elements each comprise a different type of mobile device-specific information. A method as in any above, where the mobile device-specific information comprises at least one of a mobility status based on a current cell identity, an anticipated mobility status based on the current cell identity, a cell global identity for a preferred cell, a physical cell identity for a preferred cell, an indication of a current operating system on the mobile device, an indication of a current version of software on the mobile device, an indication of a brand of the mobile device, an indication of at least one application (e.g., program) that is/are running on the UE (e.g., Facebook®, an instant messaging client, Skype®, etc.), a version of at least one application on the UE, a version of at least one active application on the UE, a type of at least one application on the UE (e.g., an application that is stored, running, active), and/or an indication of at least one frequent application on the UE (e.g., most frequently used or run, for example, as measured by active/running time, number of times the program is run, number of transmissions and/or receptions for that program, approximate interval of connection setups caused by the application, and/or any other suitable metric).

A method as in any above, where the information elements of the set of information elements each comprise a different type of mobile device-specific information. A method as in any above, where the selected information element comprises information representative of at least one of: a mobility status based on a current cell identity, an anticipated mobility status based on the current cell identity, a cell global identity for a preferred cell, a physical cell identity for a preferred cell, an indication of a current operating system on the mobile device, an indication of a current version of software on the mobile device, an indication of a brand of the mobile device, an indication of at least one application (e.g., program) that is/are running on the UE (e.g., Facebook®, an instant messaging client, Skype®, etc.), a version of at least one application on the UE, a version of at least one active application on the UE, a type of at least one application on the UE (e.g., an application that is stored, running, active), and/or an indication of at least one frequent application on the UE (e.g., most frequently used or run, for example, as measured by active/running time, number of times the program is run, number of transmissions and/or receptions for that program, approximate interval of connection setups caused by the application, and/or any other suitable metric). A method as in any above, where the mobile device-specific information is represented using at least one information element. A method as in any above, implemented within an E-UTRAN (LTE) wireless communication network.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

(8) In another exemplary embodiment, a program storage device (e.g., a computer-readable medium, a non-transitory computer readable medium; readable by a machine/apparatus/processor) tangibly embodying (e.g., storing) a program of instructions (e.g., a computer program, computer program instructions; executable by the machine/apparatus/processor) for performing operations, said operations comprising: selecting (e.g., by a mobile device) at least one information element from a set of information elements related to operation of a state transition timer for the mobile device; and generating (e.g., by the mobile device) a message comprising the selected at least one information element.

A program storage device as above, the operations further comprising: sending (e.g., transmitting; by the mobile device) the generated message towards an access point (e.g., of a wireless communication network, within a wireless communication network, a base station, a Node B, an eNB). A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(9) In a further exemplary embodiment, an apparatus comprising: at least one processor; and at least one memory including computer program code, the at least one memory and the computer program code being configured to, with the at least one processor, cause the apparatus at least to perform: select at least one information element from a set of information elements related to operation of a state transition timer for the apparatus; and generate a message comprising the selected at least one information element.

An apparatus as above, the at least one memory and the computer program code being configured to, with the at least one processor, cause the apparatus at least to further perform: send (e.g., transmit) the generated message towards an access point (e.g., of a wireless communication network, within a wireless communication network, a base station, a Node B, an eNB). An apparatus as in any above, where the apparatus comprises a user equipment, a mobile device, a mobile phone, a portable communication apparatus, a cell phone or a camera. An apparatus as in any above, further comprising one or more aspects of the exemplary embodiments of the invention as described herein.

(10) In a further exemplary embodiment, an apparatus comprising: means for selecting at least one information element from a set of information elements related to operation of a state transition timer for the apparatus; and generating a message comprising the selected at least one information element.

An apparatus as above, further comprising: means for sending (e.g., transmitting) the generated message towards an access point (e.g., of a wireless communication network, within a wireless communication network, a base station, a Node B, an eNB). An apparatus as in any above, where the apparatus comprises a user equipment, a mobile device, a mobile phone, a portable communication apparatus, a cell phone or a camera.

An apparatus as in any above, where the means for selecting and the means for generating comprise at least one processor and the means for sending comprises at least one transmitter or at least one wireless transmission component. An apparatus as in any above, further comprising one or more aspects of the exemplary embodiments of the invention as described herein.

(11) In a further exemplary embodiment, an apparatus comprising: selection circuitry configured to select at least one information element from a set of information elements related to operation of a state transition timer for the apparatus; and message generation circuitry configured to generate a message comprising the selected at least one information element.

An apparatus as above, further comprising: transmission circuitry configured to send (e.g., transmit) the generated message towards an access point (e.g., of a wireless communication network, within a wireless communication network, a base station, a Node B, an eNB). An apparatus as in any above, where the apparatus comprises a user equipment, a mobile device, a mobile phone, a portable communication apparatus, a cell phone or a camera. An apparatus as in any above, further comprising one or more aspects of the exemplary embodiments of the invention as described herein.

(12) In a further exemplary embodiment, an apparatus comprising: at least one processor configured to select at least one information element from a set of information elements related to operation of a state transition timer for the apparatus, where the at least one processor is further configured to generate a message comprising the selected at least one information element.

An apparatus as above, further comprising: at least one transmitter configured to send (e.g., transmit) the generated message towards an access point (e.g., of a wireless communication network, within a wireless communication network, a base station, a Node B, an eNB). An apparatus as in any above, where the apparatus comprises a user equipment, a mobile device, a mobile phone, a portable communication apparatus, a cell phone or a camera. An apparatus as in any above, further comprising one or more aspects of the exemplary embodiments of the invention as described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

Still further, the various names used for the messages and/or information (e.g., IEs) are not intended to be limiting in any respect, as these messages/information may be identified by any suitable names.

Figure 5:
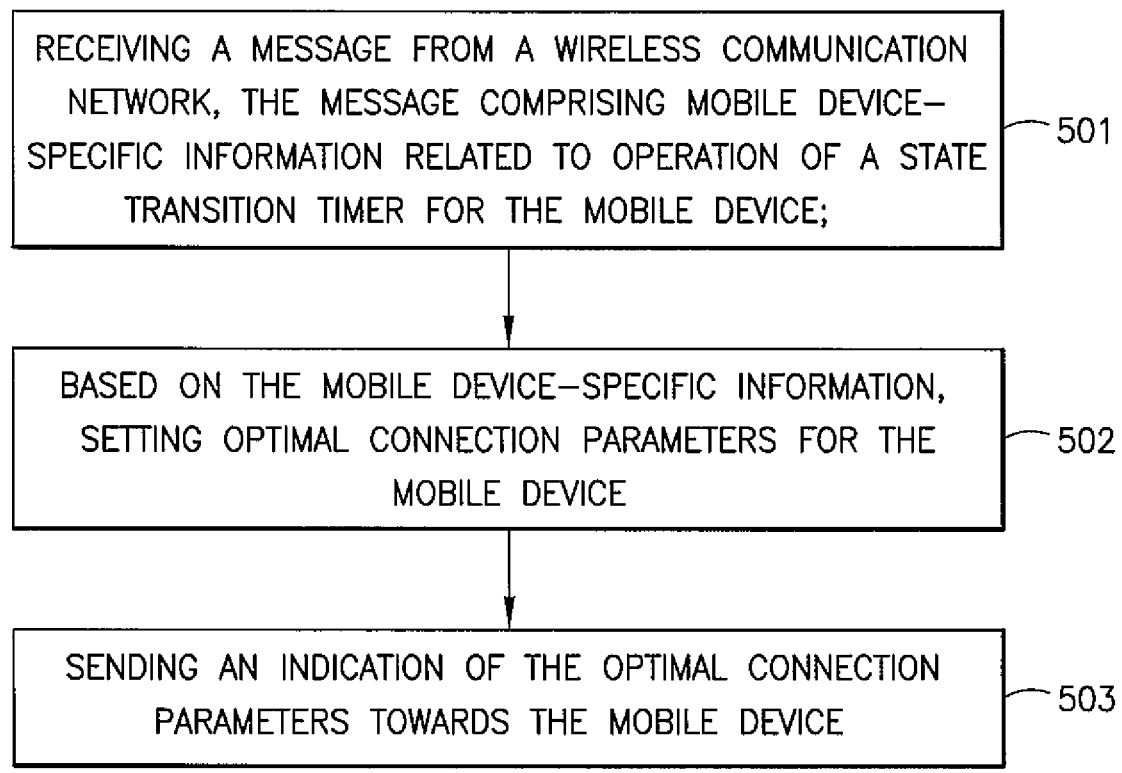

In another exemplary embodiment, and with reference to FIG. 5, there is a method comprising: receiving (e.g., with an eNB or base station) a message from a wireless communication network, the message comprising mobile device-specific information related to operation of a state transition timer for the mobile device (501); based on the mobile device-specific information, setting optimal connection parameters for the mobile device (502); and sending an indication of the optimal connection parameters towards the mobile device (503).

A method as above, further comprising: sending (e.g., transmitting; by the mobile device) the optimal connection towards an access point (e.g., of a wireless communication network, within a wireless communication network, a mobile device, UE 10. A method as in any above, where the received message including information elements comprising the mobile device-specific information which comprises at least one of a mobility status based on a current cell identity, an anticipated mobility status based on the current cell identity, a cell global identity for a preferred cell, a physical cell identity for a preferred cell, an indication of a current operating system on the mobile device, an indication of a current version of software on the mobile device, an indication of a brand of the mobile device, an indication of at least one application (e.g., program) that is/are running on the UE (e.g., Facebook®, an instant messaging client, Skype®, etc.), a version of at least one application on the UE, a version of at least one active application on the UE, a type of at least one application on the UE (e.g., an application that is stored, running, active), and/or an indication of at least one frequent application on the UE (e.g., most frequently used or run, for example, as measured by active/running time, number of times the program is run, number of transmissions and/or receptions for that program, approximate interval of connection setups caused by the application, and/or any other suitable metric).

A method as in any above, where the received at least one information element comprises information representative of at least one of: a mobility status based on a current cell identity, an anticipated mobility status based on the current cell identity, a cell global identity for a preferred cell, a physical cell identity for a preferred cell, an indication of a current operating system on the mobile device, an indication of a current version of software on the mobile device, an indication of a brand of the mobile device, an indication of at least one application (e.g., program) that is/are running on the UE (e.g., Facebook®, an instant messaging client, Skype®, etc.), a version of at least one application on the UE, a version of at least one active application on the UE, a type of at least one application on the UE (e.g., an application that is stored, running, active), and/or an indication of at least one frequent application on the UE (e.g., most frequently used or run, for example, as measured by active/running time, number of times the program is run, number of transmissions and/or receptions for that program, approximate interval of connection setups caused by the application, and/or any other suitable metric). A method as in any above, where the mobile device-specific information is represented using at least one information element. A method as in any above, implemented within an E-UTRAN (LTE) wireless communication network.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

The various blocks shown in FIGS. 3, 4, and/or 5 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 3, 4, and 5 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 3, 4, and/or 5 should be considered merely exemplary and non-limiting. It should be appreciated that the blocks depicted in FIGS. 3, 4, and 5 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 3, 4, and 5 so as to implement one or more further exemplary embodiments of the invention, such as those described in further detail herein.

That is, the non-limiting, exemplary embodiments of the invention shown in FIGS. 3, 4, and/or 5 may be implemented, practiced or utilized in conjunction with one or more further aspects in any combination (e.g., any combination that is practicable, suitable and/or feasible) and are not limited only to the blocks, steps, functions and/or operations illustrated in FIGS. 3 and 4.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
   determining mobile device-specific information for a mobile device associated with a wireless communication network, wherein the mobile device-specific information comprises dynamic information based at least on a mobility status anticipated for the mobile device;
   generating a message based on the mobile device-specific information to adjust a setting of at least one timer at an access point associated with the wireless communication network for at least one state transition of the mobile device from one state of a plurality of states to another state of the plurality of states at an expiration of the at least one timer; and
   sending the generated message towards the access point associated with the wireless communication network.

2. An apparatus comprising:
   at least one processor; and
   at least one non-transitory memory including computer program code, where the at least one memory and the computer program code are configured, with the at least one processor, to cause the apparatus to at least:
   receive, from a mobile device associated with a wireless communication network, mobile device-specific information, wherein the mobile device-specific information comprises dynamic information based at least on a mobility status anticipated for the mobile device;
   generate a message based on the mobile device-specific information to adjust a setting of at least one timer at an access point associated with the wireless communication network for at least one state transition of the mobile device from one state of a plurality of states to another state of the plurality of states at an expiration of the at least one timer; and
   cause a transmission of the generated message towards the access point associated with the wireless communication network.

3. The apparatus according to claim 2, where the message is transmitted in one of with or after one of a radio resource control connection complete message and a handover complete message.

4. The apparatus according to claim 2, where the mobile device-specific information comprises an indication of a current operating system running on the mobile device.

5. The apparatus according to claim 2, where the mobile device-specific information comprises an indication of a brand of the mobile device.

6. The apparatus according to claim 2, where the mobile device-specific information comprises an indication of at least one of an application running on the mobile device.

7. The apparatus according to claim 2, where the mobile device-specific information comprises an application most frequently run on the mobile device.

8. The apparatus according to claim 7, where the application most frequently run on the mobile device is determined based on at least one of:
   a number of times the program is run,
   a number of transmissions and/or receptions for that program, and
   an interval of connection setups caused by the application.

9. The apparatus according to claim 2, where the mobility status anticipated for the mobile device is based on at least one of a cell global identity for a cell preferred by a user of the mobile device, and a physical cell identity for a cell preferred by a user of the mobile device.

10. The apparatus according to claim 2, wherein the at least one memory and the computer program code are configured, with the at least one processor, to cause the apparatus to at least:
    select at least one information element from a set of information elements related to the operation of the at least one timer for the at least one state transition of the mobile device, where generating the message comprises using the selected at least one information element to represent the mobile device specific information, where each information element of the set of information elements comprises a different type of mobile device-specific information.

11. The apparatus according to claim 2, where the mobile device comprises one of a cell phone and a camera.

12. The apparatus according to claim 2, where the wireless communication network is an evolved universal terrestrial radio access network long term evolution wireless communication network.

13. The apparatus according to claim 2, wherein the mobility status anticipated for the mobile device is based on a current cell identity.

14. An apparatus comprising:
    at least one processor; and
    at least one non-transitory memory including computer program code, where the at least one memory and the computer program code are configured, with the at least one processor, to cause the apparatus to at least:
    cause a reception of a message from a wireless communication network, the message comprising mobile device, wherein the mobile device-specific information comprises dynamic information based at least on a mobility status anticipated for the mobile device;
    cause to adjust a setting of at least one timer at an access point associated with the wireless communication network for at least one state transition of the mobile device from one state of a plurality of states to another state of the plurality of states at an expiration of the at least one timer; and
    based on the message comprising the mobile device-specific information, adjust the state transition timer for the mobile device, and cause the mobile device to transition from one state of a plurality of states to another state of the plurality of states at expiration of the state transition timer.

15. The apparatus according to claim 14, where the message is received
    either with or after one of: a radio resource control connection complete message and a handover complete message.

16. The apparatus according to claim 14, where the mobile device-specific information comprises an indication of at least one a current operating system running on the mobile device.

17. The apparatus according to claim 14, where the mobile device-specific information comprises an indication of a brand of the mobile device.

18. The apparatus according to claim 14, where the mobile device-specific information comprises an indication of at least one of an application running on the mobile device.

19. The apparatus according to claim 14, where the mobile device-specific information comprises an indication of an application most frequently run on the mobile device.

20. The apparatus according to claim 14, where the application most frequently run on the mobile device is based on at least one of:

a number of times the program is run,
a number of transmissions and/or receptions for that program,
and an interval of connection setups caused by the application.

\* \* \* \* \*